UNITED STATES PATENT OFFICE.

SAMUEL LA FORGE, OF CLEVELAND, OHIO.

IMPROVEMENT IN WATER-PROOF LEATHER GOODS.

Specification forming part of Letters Patent No. 27,337, dated February 28, 1860.

*To all whom it may concern:*

Be it known that I, SAMUEL LA FORGE, of the city of Cleveland, in the State of Ohio, have invented a new and useful article of manufacture denominated "India-Rubber Leather;" and I do hereby declare that the following is a full, clear, and exact description of the same.

My invention consists in producing from the skins of the various animals, which are now used for making "upper-leather," and a solution of india-rubber or gutta-percha charged with sulphur, an article of manufacture which may with propriety be called "india-rubber leather."

I have carried out my invention in the following manner, although, as is evident, the manner may be varied without departing from the nature and character of my invention.

I take any skin of an animal from which upper-leather is usually made, after it has gone through the tanning process, but previous to its being put through the dressing process, and after having exposed it to a sufficient degree of heat to drive off its fluid particles, I coat it with a solution of india-rubber or gutta-percha charged with sulphur, and then subject the skin thus coated to the usual vulcanizing process. By the means and in the manner here named I have produced a pliable, soft, and perfectly water-impervious article, glossy and in every respect equal to japanned leather, without its liability to crack.

I am aware that the vulcanized solutions of rubber have been applied to leather, cloth, and other fabrics, and that the upper parts of the shoe have been formed of "leather dressed without oil," and the vulcanized solutions applied to it; but it is evident from a comparison of the articles produced by either of these plans and the articles produced by me that my invention is entirely distinct from those here named.

What I claim, then, as my invention, and desire to secure by Letters Patent, is—

The article of manufacture herein named, prepared from the undressed skin, exposed to heat, coated with the charged rubber solution, and then subjected to the vulcanizing process, as herein set forth.

SAML. LA FORGE.

Witnesses:
C. M. NORTHRUP,
T. T. EVERETT.